US009706344B2

(12) United States Patent
Sato et al.

(10) Patent No.: US 9,706,344 B2
(45) Date of Patent: Jul. 11, 2017

(54) DATA UPDATE AND TRANSMISSION OF UPDATED DATA BY AN INFORMATION PROCESSING APPARATUS WITH A STORAGE APPARATUS HAVING A WIRELESS COMMUNICATION FUNCTION

(71) Applicant: KABUSHIKI KAISHA TOSHIBA, Tokyo (JP)

(72) Inventors: Keisuke Sato, Kanagawa (JP); Michio Ido, Kanagawa (JP); Shigeto Endo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/253,885

(22) Filed: Sep. 1, 2016

(65) Prior Publication Data
US 2017/0099565 A1   Apr. 6, 2017

(30) Foreign Application Priority Data
Oct. 2, 2015 (JP) ................................. 2015-197022

(51) Int. Cl.
*H04W 4/00* (2009.01)
*H04B 5/00* (2006.01)
(Continued)

(52) U.S. Cl.
CPC .......... *H04W 4/008* (2013.01); *H04B 5/0031* (2013.01); *H04B 5/0075* (2013.01); *H04M 1/72563* (2013.01); *H04W 76/021* (2013.01)

(58) Field of Classification Search
CPC ... H04B 5/0031; H04B 5/0075; H04W 4/008; H04W 76/021
See application file for complete search history.

(56) References Cited

U.S. PATENT DOCUMENTS 7,250,867 B2   7/2007   Sakama et al.
7,482,934 B2   1/2009   Nakamura et al.
(Continued)

FOREIGN PATENT DOCUMENTS

JP   2003169965 A   6/2003
JP   2005509501 A   4/2005
(Continued)

*Primary Examiner* — Tuan Pham
(74) *Attorney, Agent, or Firm* — Patterson & Sheridan, LLP

(57) ABSTRACT

An information processing apparatus includes a wireless communication unit that causes an induction current for wireless communication with a storage apparatus that has a wireless communication function, and a processor. The processor executes a user-interactive application in association with an accessory ID of an accessory and status information thereof, when the accessory ID and the status information are received from the storage apparatus within a wireless communication range, the status information of the accessory ID being updated during execution of the user-interactive application. The processor then transmits wirelessly, to the storage apparatus, the accessory ID and the updated status information, such that a first visual or audio output corresponding to the accessory ID and the updated status information is generated by a host device when the host device is physically coupled with the storage apparatus.

20 Claims, 12 Drawing Sheets

(51) Int. Cl.
*H04W 76/02* (2009.01)
*H04M 1/725* (2006.01)

(56) References Cited

U.S. PATENT DOCUMENTS

| | | |
|---|---|---|
| 8,798,542 B2 | 8/2014 | Oba et al. |
| 8,832,815 B2 * | 9/2014 | Small ................ H04M 1/72525 370/328 |
| 2004/0214642 A1 | 10/2004 | Beck |
| 2005/0101309 A1 * | 5/2005 | Croome ................ G06F 9/445 455/418 |
| 2007/0252706 A1 | 11/2007 | Furutani |
| 2013/0260900 A1 * | 10/2013 | Nemoto ................ A63F 13/92 463/92 |
| 2014/0226293 A1 | 8/2014 | Sato |
| 2014/0246504 A1 | 9/2014 | Ikemoto et al. |

FOREIGN PATENT DOCUMENTS

| | | |
|---|---|---|
| JP | 2005-210676 A | 8/2005 |
| JP | 4655439 B2 | 3/2011 |
| JP | 4667397 B2 | 4/2011 |
| JP | 2014-154777 A | 8/2014 |
| WO | 2006075359 A1 | 7/2006 |

* cited by examiner

DATA UPDATE AND TRANSMISSION OF UPDATED DATA BY AN INFORMATION PROCESSING APPARATUS WITH A STORAGE APPARATUS HAVING A WIRELESS COMMUNICATION FUNCTION

CROSS-REFERENCE TO RELATED APPLICATION

This application is based upon and claims the benefit of priority from Japanese Patent Application No. 2015-197022, filed Oct. 2, 2015, the entire contents of which are incorporated herein by reference.

FIELD

Embodiments described herein relate generally to an information processing apparatus, in particular, data update and transmission of updated data by an information processing apparatus with a storage apparatus having a wireless communication function.

BACKGROUND

In general, when a storage apparatus is mounted on the electronic apparatus, the electronic apparatus is able to store data in the storage apparatus, or read out the data stored in the storage apparatus. A storage apparatus of one type includes a memory card including a wireless antenna and having a wireless communication function.

DETAILED DESCRIPTION

Figure 1:
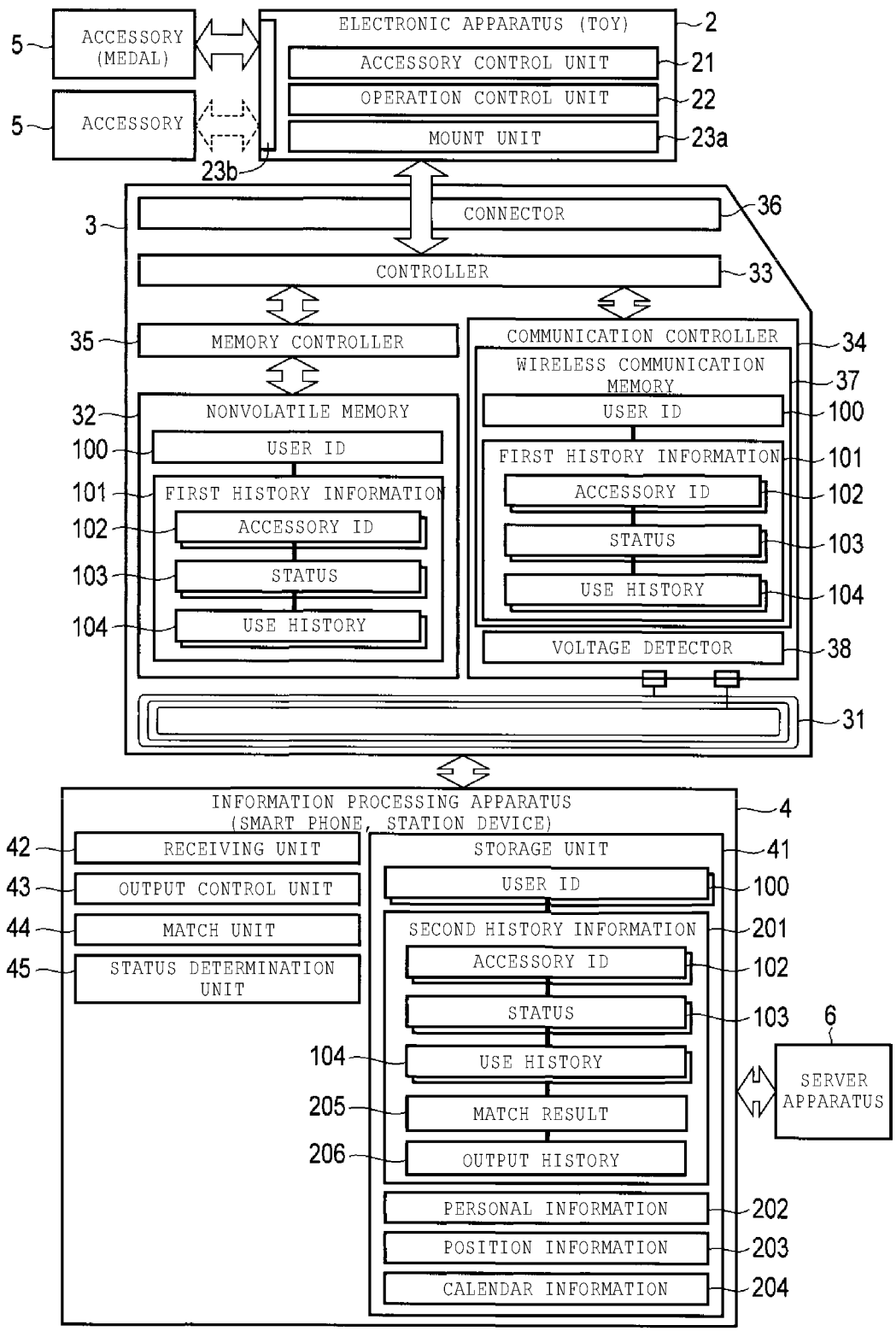
FIG. 1 is a block diagram of an information processing system according to a first embodiment.

An embodiment provides an information processing apparatus which wirelessly communicates with a storage apparatus having a wireless communication function, and an information processing system including the storage apparatus and the information processing apparatus.

In general, according to an embodiment, an information processing apparatus includes a wireless communication unit that causes an induction current for wireless communication with a storage apparatus that has a wireless communication function using power generated in the storage apparatus by the induction current, and a processor. The processor executes a user-interactive application in association with an accessory ID of an accessory and status information thereof, when the accessory ID and the status information are received from the storage apparatus that is within a wireless communication range, the status information of the accessory ID being updated during execution of the user-interactive application. The processor then transmits wirelessly, to the storage apparatus, the accessory ID and the updated status information, such that a first visual or audio output corresponding to the accessory ID and the updated status information is generated by a host device when the host device is physically coupled with the storage apparatus, the first visual or audio output being different from a visual or audio output generated by the host device when the storage apparatus was physically coupled with the host device prior to the update.

Hereinafter, respective embodiments will be described with reference to the drawings. In the following description, approximately or substantially the same functions and components are denoted by the same reference numerals, and a description will be given as necessary.

First Embodiment

The present embodiment describes an electronic apparatus in which a storage apparatus having a wireless communication function (hereinafter, referred to as a wireless storage apparatus) is detachably mountable, the wireless storage apparatus (which is detachably mountable in the electronic apparatus), an information processing apparatus capable of performing wireless communication with the wireless storage apparatus, and an information processing system including the electronic apparatus, the wireless storage apparatus, and the information processing apparatus.

In the information processing system according to the present embodiment, the electronic apparatus and the information processing apparatus are capable of communicating with each other, by using the storage apparatus having a wireless communication function. In the present embodiment, identification information is referred to as ID.

In the present embodiment, the electronic apparatus stores a user ID and first history information about use history of the electronic apparatus in the wireless storage apparatus. The wireless storage apparatus wirelessly transmits the user ID and the first history information to the information processing apparatus. The information processing apparatus having the user ID and second history information correlated with the user ID, stored therein, and updates (changes) the second history information based on the user ID and the first history information which are received. The information processing apparatus performs various processes (services), based on the second history information and other various types of data if necessary, and changes the second history information correlated with the user ID, based on the processing result. The information processing apparatus causes a change in the first history information correlated with the user ID which is stored in the wireless storage apparatus, based on the changed second history information correlated with the user ID, through wireless communication. The electronic apparatus operates, based on the changed first history information.

FIG. 1 is a block diagram of an information processing system according to the present embodiment.

An information processing system 1 includes an electronic apparatus 2, a wireless storage apparatus 3, an information processing apparatus 4, and a server apparatus 6.

The electronic apparatus 2 may be, for example, a toy, a smart watch, a game machine, a mobile phone, a computer, a wearable terminal, a digital camera, or the like. In the present embodiment, it is assumed that the electronic apparatus 2 is a toy. For example, the electronic apparatus 2 may be a watch-type toy.

The electronic apparatus 2 includes a mount unit 23a in which the wireless storage apparatus 3 is detachably mountable.

The user can insert the wireless storage apparatus 3 into the mount unit 23a, and remove (draw out) the wireless storage apparatus 3 from the mount unit 23a.

If the wireless storage apparatus 3 is mounted in the mount unit 23a, the electronic apparatus 2 is electrically connected to the wireless storage apparatus 3, and can transmit and receive commands, addresses, data, information, instructions, signals, and the like to and from the wireless storage apparatus 3.

The electronic apparatus 2 includes also a mount unit 23b to which the accessory 5 is detachably mountable.

The user can attach the accessory 5 to the mount unit 23b of the electronic apparatus 2, and replace the mounted accessory 5 with another accessory.

The accessory 5 is, for example, an article compatible with or to be accompanied with the electronic apparatus 2. The accessory 5 is, for example, medals, keychains, straps, cards, or the like. In the present embodiment, it is assumed that the accessory 5 is a medal.

For example, the accessory 5 has a code or a groove indicating an accessory ID of the accessory 5. The electronic apparatus 2 is able to read the accessory ID. The accessory ID may be, for example, a bit code, a bar code, or a QR Code®, formed or printed on a surface of the accessory 5.

The accessory ID may be an ID specific to the accessory 5, or an ID indicating the type (for example, the version, or the like) of the accessory 5.

Further, the accessory 5 may have an electronic apparatus ID in addition to the accessory ID. In this case, in addition to the accessory ID, the electronic apparatus ID is also read by the electronic apparatus 2.

In the present embodiment, the accessory ID may include the electronic apparatus ID as a part thereof. When the accessory ID includes the electronic apparatus ID, the data management and data communication can be made efficient and simplified.

The electronic apparatus ID may be an ID specific to the electronic apparatus 2, or an ID indicating the type (for example, the version, or the like) of the electronic apparatus 2. The electronic apparatus 2 manages the electronic apparatus ID, and the electronic apparatus 2 may transmit the electronic apparatus ID to the wireless storage apparatus 3.

The electronic apparatus 2 executes an operation according to data (for example, user ID and first history information) stored in the wireless storage apparatus 3. For example, the electronic apparatus 2 outputs content is stored in the wireless storage apparatus 3 in response to the operation by the user, and changes status corresponding to the content.

Examples of the operation by the user include turning on and off the electronic apparatus 2, mounting an accessory, removing an accessory, or pressing down an operation button.

The content may be image data (still image data, and moving image data), audio data (music data, voice data, and the like), video data, and the like. The content may relate to a character. In the present embodiment, the content includes audio data as one example.

The status may be a parameter indicating growth information (for example, the strength, level, version, or the like) of the character corresponding to the accessory 5.

The electronic apparatus 2 may access the wireless storage apparatus 3 by polling or in response to the operation by the user, recognize the change of the status, and output content based on the changed status.

The electronic apparatus 2 may bi-directionally communicate with the accessory 5, as well as the wireless storage apparatus 3. The communication between the electronic apparatus 2 and the accessory 5 is not limited to two-way communication. For example, the electronic apparatus 2 may read the information attached to the accessory 5. The information attached to the accessory 5 may be, for example, an accessory ID, and audio data corresponding to the accessory 5.

The electronic apparatus 2 includes an accessory control unit 21 and an operation control unit 22.

The accessory control unit 21 recognizes the accessory ID of the accessory 5 mounted in the electronic apparatus 2, and stores the accessory ID in a nonvolatile memory 32 of the wireless storage apparatus 3. For example, accessory control unit 21 stores the accessory ID in the nonvolatile memory 32 in association with the user ID and so as to be included in the first history information 101.

The operation control unit 22 recognizes the accessory ID of the accessory 5 mounted in the electronic apparatus 2 and the content ID of content to be output corresponding to the accessory ID or address, based on data stored in the wireless storage apparatus 3, reads the content corresponding to the recognized content ID or address from the wireless storage apparatus 3, and outputs the read content.

The wireless storage apparatus 3 may be any of various types of storage apparatuses such as, for example, a memory card (such as an SD memory card and a multimedia card), a universal serial bus (USB) memory, a hard disk drive (HDD) or a solid state disk (SSD). In the present embodiment, it is assumed that the wireless storage apparatus 3 is a memory card.

In the present embodiment, the wireless storage apparatus 3 performs, for example, wireless communication conforming to near field communication (NFC), which is the short-range wireless communication standard at a frequency of 13.56 MHz or the like. However, the wireless communication by the wireless storage apparatus 3 may be another wireless communication such as, for example, a wireless local area network (LAN). The NFC enables communication at lower power consumption than a general wireless LAN.

If the wireless storage apparatus 3 is mounted on the electronic apparatus 2, the wireless storage apparatus 3 is electrically connected to the electronic apparatus 2, and receives power from the electronic apparatus 2. The wireless storage apparatus 3 has a function of storing data from the electronic apparatus 2 and a function of transmitting read data to the electronic apparatus 2. The wireless storage apparatus 3 has a function of communicating data using power generated (induced) by electromagnetic induction of the wireless antenna 31 even if power is not supplied from the electronic apparatus 2. In other words, the wireless storage apparatus 3 performs, for example, wireless communication, and transmits or receives data to or from the information processing apparatus 4. At least some components of the wireless storage apparatus 3 are operable with the power generated by electromagnetic induction based on radio waves from the information processing apparatus 4, even if power is not supplied from the electronic apparatus 2.

Although the wireless storage apparatus 3 transmits and receives data to and from the electronic apparatus 2 according to a wired interface such as, for example, an SD interface in the present embodiment, other interfaces may be used. Further, although the wireless storage apparatus 3 transmits and receives data to and from the information processing apparatus 4 by using, for example, an NFC interface, other wireless communication interfaces may be used.

The wireless storage apparatus 3 includes a wireless antenna 31, a nonvolatile memory 32, a controller 33, a communication controller 34, a memory controller 35, and a connector 36. The communication controller 34 includes a wireless communication memory 37 and a voltage detector 38. The communication controller 34 and the wireless communication memory 37 may be configured separately. It is possible to combine or separate the controller 33, the communication controller 34, and the memory controller 35.

The controller 33, the memory controller 35, and the nonvolatile memory 32 operate, when the wireless storage apparatus 3 receives power from the electronic apparatus 2. When the wireless storage apparatus 3 receives power only from the wireless antenna 31, and not from the electronic apparatus 2, the controller 33, the memory controller 35, and the nonvolatile memory 32 may not necessarily operate. Meanwhile, the communication controller 34 is operable, even if the wireless storage apparatus 3 receives power only from the wireless antenna 31, and not from the electronic apparatus 2. In other words, if the wireless antenna 31 receives wireless radio waves of a predetermined frequency compatible with NFC, the communication controller 34 is operable, and as a result the wireless storage apparatus 3 can perform communication by NFC.

The nonvolatile memory 32 may be, for example, a nonvolatile semiconductor memory. The nonvolatile memory 32 is, for example, a NAND-type flash memory, but may be another non-volatile semiconductor memory such as a NOR-type flash memory, a magnetoresistive random access memory (MRAM: a magnetoresistive memory), a phase-change random access memory (PRAM: a phase-change memory), a resistive random access memory (ReRAM: a resistance-change memory), and a ferroelectric random access memory (FeRAM). The nonvolatile memory 32 may be another type of nonvolatile memory, a magnetic memory, or the like. For example, the nonvolatile memory 32 may be a flash memory of a three-dimensional structure.

The nonvolatile memory 32 operates, for example, when the electronic apparatus 2 supplies power to the wireless storage apparatus 3.

In the present embodiment, the nonvolatile memory 32 stores, for example, a user ID 100 and first history information 101.

The first history information 101 includes, for example, an accessory ID 102 that is used by the electronic apparatus 2, status 103 associated with each accessory ID 102, and use history 104 of the electronic apparatus 2. The first history information 101 corresponds to log data indicating the use state of the user of the electronic apparatus 2.

The use history 104 may include, for example, the number of times or time at which the accessory 5 has been attached or detached for each accessory ID. Further, the use history 104 may include, for example, the number of times or time at which the wireless storage apparatus 3 and the information processing apparatus 4 has performed wireless communication for each accessory ID.

Further, the first history information 101 may include data about time at which the accessory ID 102 has been stored.

The nonvolatile memory 32 may include content to be output corresponding to the accessory ID, a content ID of the content, an address of the storage position of the content, and the like. The nonvolatile memory 32 may store, for example, an electronic apparatus ID (version information) of the current electronic apparatus 2. The electronic apparatus 2 can recognize which content is to be output for each accessory ID, by referring to the information stored in the nonvolatile memory 32.

The controller 33 receives commands, addresses, data, information, instructions, signals, or the like, from the electronic apparatus 2, the memory controller 35, and the communication controller 34.

The controller 33 outputs the commands, the addresses, the data, the information, the instructions, the signals, or the like, to the memory controller 35, the communication controller 34, and the electronic apparatus 2, based on the received command.

In the present embodiment, the controller 33 may operate, based on software such as firmware, an operating system, and an application program.

The controller 33 stores in the nonvolatile memory 32, a user ID 100, first history information 101, content, a content ID, an address of content, a first copy flag, and the like.

The first copy flag indicates whether or not the data stored in the nonvolatile memory 32 have been copied (may be moved or transferred) to the wireless communication memory 37.

The controller 33 performs, for example, mirroring to synchronize contents stored in the nonvolatile memory 32 and content stored in the wireless communication memory 37.

For example, when data to be mirrored is stored or changed in one of the nonvolatile memory 32 and the wireless communication memory 37, the controller 33 stores data with the same contents or changes data to the same contents in the other memory by the mirroring. In the present embodiment, target data of the mirroring include the user ID 100, the first history information 101, and the like.

The controller 33 performs the mirroring, in a state where power is supplied to the wireless storage apparatus 3, for example, in a state where the user mounts the wireless storage apparatus 3 on the electronic apparatus 2. When the wireless storage apparatus 3 is receiving power, the controller 8 may every time perform the mirroring. When the mirroring is performed immediately after turning on the power of the electronic apparatus 2, the electronic apparatus 2 can reflect the change of the wireless communication memory 37 in the nonvolatile memory 32 without omission during the power off of the electronic apparatus 2. Even when the electronic apparatus 2 does not supply power to the wireless storage apparatus 3, the wireless storage apparatus 3 receives data from the information processing apparatus 4, such that the controller 33 may execute, for example, a process such as the mirroring.

The timing of mirroring may not be initiated upon power supply to the wireless storage apparatus 3. For example, the mirroring may be initiated when the wireless storage apparatus 3 receives a wireless communication instruction from the information processing apparatus 4, upon power OFF of the wireless storage apparatus 3, each predetermined period of time, upon mounting of the accessory 5, or upon removal of the accessory 5.

The controller 33 may compress data to be stored in the wireless communication memory 37. The controller 33 executes the compression, by using, for example, the Huffman code. When reading the data stored in the wireless communication memory 37, the controller 33 decompresses the compressed data and reads out the decompressed data so as to output the data. The compression and decompression of data may be performed by the controller 33. Alternatively, the wireless storage apparatus 3 may include a compressor and a decompressor, and the controller 33 may control the compressor to compress data and the decompressor to decompress data.

The memory controller 35 controls the nonvolatile memory 32. The memory controller 35 stores data into the nonvolatile memory 32, for example, based on the commands or the like which are input from the controller 33. The memory controller 35 reads data from the nonvolatile memory 32 and outputs the data to the controller 33, for example, based on commands or the like which are input from the controller 33. The memory controller 35 may directly communicate with the communication controller 34 or the electronic apparatus 2, without communicating with the controller 33.

The wireless antenna 31 is, for example, a PCB pattern antenna. The operation possible frequency band of the wireless antenna 31 may be a predetermined frequency band compatible with NFC.

The wireless antenna 31 is capable of generating power by electromagnetic induction, based on, for example, the radio waves from the information processing apparatus 4. The wireless antenna 31 supplies the generated power to the communication controller 34.

The wireless antenna 31 receives commands, addresses, data, information, instructions, signals, or the like, from the information processing apparatus 4. The wireless antenna outputs the received command, and the like, to the communication controller 34.

The communication controller 34 performs communication with the information processing apparatus 4 and the like through the wireless antenna 31. The communication controller receives commands, addresses, data, information, instructions, signals, or the like from the controller 33 and the wireless antenna 31. The communication controller 34 outputs, for example, data and the like, to the controller 33 and the wireless antenna 31, based on the received command. The communication controller 34 reads data from the wireless communication memory 37, based on the received command, address, and the like, and outputs the read data to the controller 33, and the wireless antenna 31. The communication controller 34 stores data in the wireless communication memory 37, based on the received command, address, data and the like.

In the present embodiment, the communication controller 34 receives changed status 103 which is determined by the information processing apparatus 4 and corresponds to the accessory ID, from the information processing apparatus 4 through the wireless antenna 31, and stores the received changed status 103 in the wireless communication memory 37. The changed status 103 corresponding to the accessory ID is stored in the nonvolatile memory 32, by the mirroring.

The commands, the addresses, the data, the information, the instructions, the signals, or the like, which are communicated among the electronic apparatus 2, the controller 33, the memory controller 35, the communication controller 34, the wireless antenna 31, and the like, are not necessarily in the same format. As long as both communication parties can recognize commands, addresses, data, information, instructions, signals, or the like, the commands, addresses, data, information, instructions, signals, or the like, which are communicated by other parties, do not need to be in the same format.

When receiving commands and data through the controller 33 or the wireless antenna 31, the communication controller 34 stores data in the wireless communication memory 37. The communication controller 34 may not necessarily perform the writing of data into the wireless communication memory 37.

The wireless communication memory 37 is, for example, a nonvolatile memory. The wireless communication memory 37 stores data under the control of the communication controller 34 or the memory controller 35. Here, storing of data in the wireless communication memory 37 may be temporary. For example, although an electrically erasable programmable read-only memory (EEPROM) is used as the wireless communication memory 37, it is possible to use various types of memories similarly to the nonvolatile memory 32.

It is desirable that the nonvolatile memory used in the wireless communication memory 37 has lower power consumption per unit volume than the nonvolatile memory 32, so as to be operable with the power supplied from the wireless antenna 31. Specifically, a NOR type memory may be used.

In the present embodiment, the wireless communication memory 37 stores part or all of the data stored in the nonvolatile memory 32. For example, the wireless communication memory 37 stores the user ID 100, the first history information 101, the second copy flag, and a transmission flag.

The second copy flag indicates whether or not data stored in the wireless communication memory 37 have been copied to the nonvolatile memory 32.

The transmission flag indicates whether or not the wireless storage apparatus 3 has transmitted the user ID 100 and the first history information 101, which are stored in the wireless communication memory 37, to the information processing apparatus 4.

In addition, the wireless communication memory 37 may store, for example, data related to the wireless storage apparatus 3 (some data stored in the nonvolatile memory 32 (for example, image data, audio data, video data, or the like), data related to the data stored in the nonvolatile memory 32, data related to the nonvolatile memory 32 and the wireless storage apparatus 3), data related to the information processing apparatus 4, or data related to the accessory 5 mounted on the electronic apparatus 2, commands received from the controller 33, the information processing apparatus 4, or the like.

Specific examples of the data stored in the wireless communication memory 37 are as follows. It is noted that these are merely examples, and data stored in the wireless communication memory 37 is not limited thereto.

The data relevant to the image data stored in the nonvolatile memory 32 is, for example, file name data, a first or last part of image data, thumbnail image data of image data, file generation time data, imaging time data, data ID, and the like.

The data relevant to the audio data stored in the nonvolatile memory 32 is, for example, file name data, a first or last part of audio data, output time data of audio data, file generation time data, data ID, and the like.

The data relevant to the video data stored in the nonvolatile memory 32 is memory capacity data, remaining capacity data, data of the number of files, and the like of the nonvolatile memory 32.

The data related to the wireless storage apparatus 3 is recognition ID data (identification number which is arbitrarily assigned to each wireless storage apparatus 3, for example, a unique product ID assigned at the time of manufacture, or ID which is arbitrarily assigned subsequently to each wireless storage apparatus 3), or comments (text data associated with the wireless storage apparatus 3, which is stored by the user in the wireless storage apparatus 3 through the electronic apparatus 2).

Data related to the electronic apparatus 2 is the recognition ID data of the electronic apparatus 2, change information of firmware of the electronic apparatus 2, flag information generated based on these pieces of information, or the like.

Data related to the accessory 5 is the recognition ID data of the accessory 5, data included in the code on the accessory 5, flag information generated from the data, or the like.

The voltage detector 38 is electrically connected to the wireless antenna 31. The voltage detector 38 detects voltage of the power supplied from the wireless antenna 31 to the communication controller 34. The voltage detector 38 issues a reset command of NFC communication, until the voltage reaches a predetermined value at which the communication controller 34 is operable. The communication controller 34 does not perform NFC communication while receiving the reset command. This reset command prevents an abnormal activation and operation of NFC communication. When the voltage reaches the predetermined value, the voltage detector 38 may output an operational command to the communication controller 34. In this case, only when receiving the operational command, the communication controller 34 performs NFC communication.

The connector 36 is, for example, a standardized connection terminal, and is electrically connectable with the electronic apparatus 2.

The information processing apparatus 4 is, for example, cellular phones, computers, game machines, station apparatuses, wearable terminals, or the like. The station apparatuses are devices which are set in shopping malls, electronics stores, toy stores, or the like, such as kiosks. The information processing apparatus 4 is able to transmit and receive commands, addresses, data, information, instructions, signals, or the like to and from the wireless storage apparatus 3.

The information processing apparatus 4 includes, for example, a storage unit 41, a receiving section 42, an output control section 43, a match section 44, and a status determination section 45.

In the present embodiment, the receiving section 42, the output control section 43, the match section 44, and the status determination section 45 may be implemented by the information processing apparatus 4 executing, for example, a program which is downloaded from the server apparatus 6 and installed to the information processing apparatus 4.

The storage unit 41 stores, for example, a user ID 100, second history information 201 and personal information 202, which are associated with the user ID 100, position information 203 of the information processing apparatus 4, calendar information 204, time information (not illustrated), and weather information (not illustrated).

The second history information 201 includes an accessory ID 102, status 103 and use history 104 which are associated with each accessory ID 102, a match result 205, and an output history 206. The second history information 201 corresponds to log data indicating use state of the information processing apparatus 4.

The match result 205 is, for example, information in which the accessory ID is associated with win or loss when a character corresponding to the accessory ID plays a match through the match section 44.

The output history 206 is, for example, history information indicating the output state of content by the information processing apparatus 4.

The personal information 202 includes information such as the birthday, the age, the address, and the schedule of the user of the information processing apparatus 4 or the user of the electronic apparatus 2.

The position information 203 is information indicating the position of the information processing apparatus 4, which is obtained by, for example, a global positioning system (GPS).

The calendar information 204 associates date and time and an event corresponding to the date and time with each other. Examples of the event include New Year, traditional end of winter, Doll Festival, Children's Day, Christmas, New Year's Eve, or the like.

The time information and the weather information are, for example, information that a mobile phone or the like can obtain.

The storage unit 41 may include content corresponding to the accessory ID, a content ID of the content, an address indicating the stored position of the content, and the like.

The receiving section 42 receives an accessory ID 102 of the accessory 5 which is mounted on the electronic apparatus 2, and the status 103 and the use history 104 which are associated with the accessory ID, from the wireless storage apparatus 3. The receiving section 42 stores, for example, the received accessory ID 102 and status 103 in the storage unit 41, so as to be included in the second history information 201.

The output control section 43 controls output of the contents at the information processing apparatus 4. For example, the output control section 43 operates to display a plurality of characters, based on the plurality of accessory IDs included in the second history information 201. For example, the output control section 43 changes audio data to be output, based on the use history 104 for the accessory ID included in the second history information 201. For example, the output control unit displays a game character corresponding to growth information which is changed in a game, based on the game character corresponding to the accessory ID and the status which is the growth information of the game character, and outputs audio data corresponding to the growth information which is changed in a game.

The match section 44 causes characters corresponding to the accessory IDs associated with the user IDs which are different from each other to play a match against each other on an application executed by the information processing apparatus 4, for example, based on the instruction from the user. The match section 44 stores a match result 205 in the storage unit 41. In addition, characters corresponding to the accessory IDs associated with the same user ID may play a match against each other.

The status determination section 45 determines the status (changed status) corresponding to the accessory ID of the accessory 5 mounted on the electronic apparatus 2, based on the second history information 201, the personal information 202, the position information 203, the calendar information 204, the time information, and the weather information, which are stored in the storage unit 41. The output control section 43 stores the changed status in the storage unit 41 so as to be included in the second history information, and transmits the changed status to the wireless storage apparatus 3. For example, the status determination section 45 determines the changed status, based on the growth information which was changed in the game executed in the information processing apparatus 4, or the match result of the game.

The information processing apparatus 4 transmits and receives commands, addresses, data, information, instructions, signals, or the like to and from the server apparatus 6 in a wireless manner or wired manner. The wireless communication standard such as, for example, a wireless LAN, a 3rd Generation (3G), a long term evolution (LTE) is used for the communication between the information processing apparatus 4 and the server apparatus 6.

The server apparatus 6 provides a variety of services to each user. In addition, the server apparatus 6 may be omitted in the present embodiment.

Figure 2:
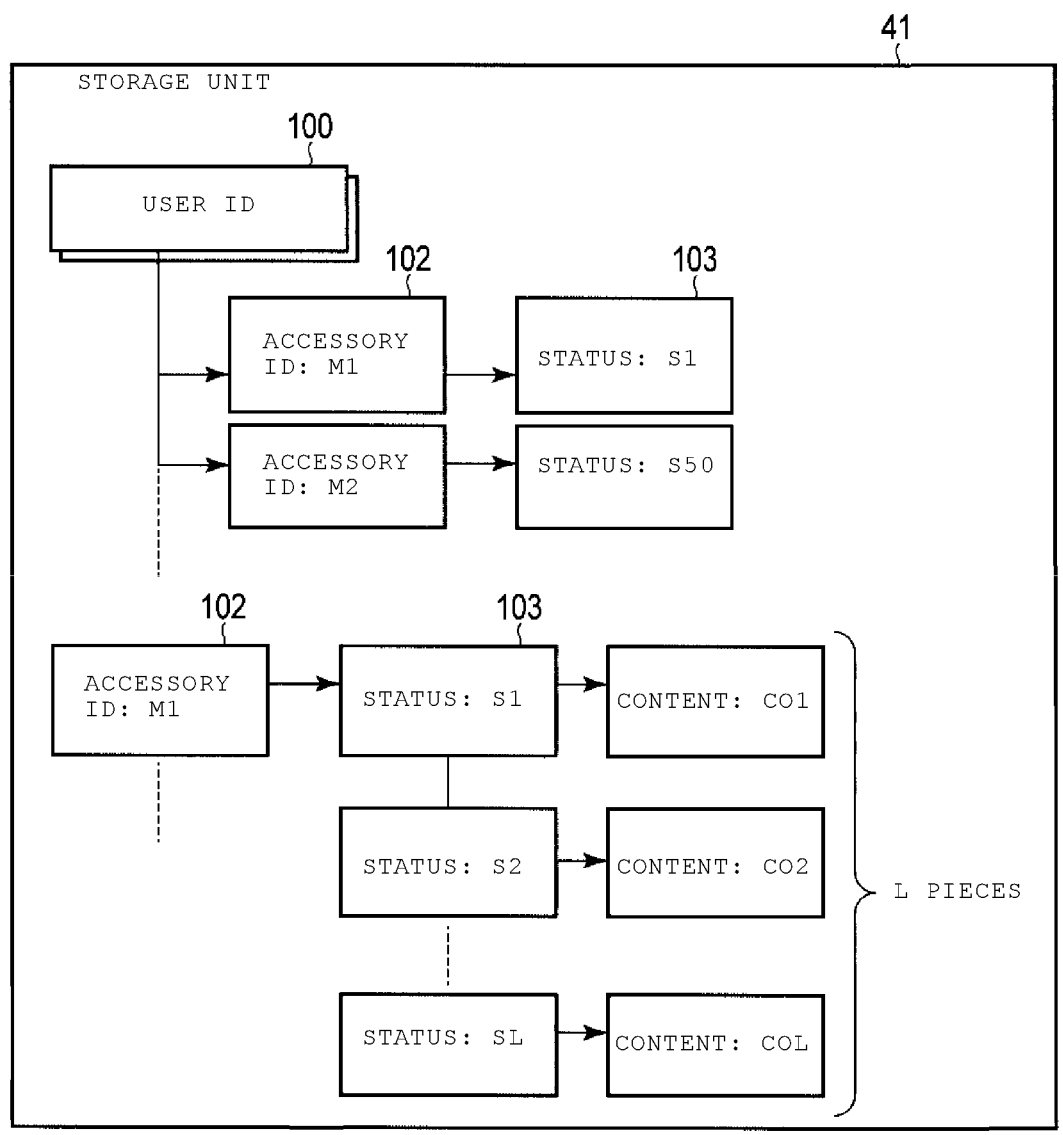
FIG. 2 illustrates a data structure of data stored in a storage unit of an information processing apparatus according to the first embodiment.

FIG. 2 illustrates a data structure of data stored in the storage unit 41 of the information processing apparatus 4 according to the first embodiment, and illustrates an example of association among the accessory ID 102, the status 103, and the content shown in FIG. 1.

The storage unit 41 stores, with respect to each user ID 100, one or more accessory IDs 102 associated therewith. Further, the current status 103 of the accessory 5 is associated with the accessory ID 102. For example, the current status of the accessory ID M1 is S1, and the current status of the accessory ID M2 is S50 as shown in FIG. 2. The number of accessory IDs 102 associated with the user ID may not be determined in advance, and for example, each time the user puts a new accessory 5 on the electronic apparatus 2, a new accessory ID corresponding to the accessory 5 may be associated. The second history information 201 includes an accessory ID 120 and the status 103.

The storage unit 41 stores, for each accessory ID 102, content to be output in association with the status 103. For example, the accessory ID M1 is associated with L pieces of status (status S1 to status SL), and each of status is associated with one of the contents CO1 to COL. The number of status associated with each accessory ID may not be fixed. The information processing apparatus 4 receives, for example, an accessory ID, a new status, and a new content, through communication with the server apparatus 6, and may add the accessory ID, the new status, and the new content to the storage unit 41, in association with each other.

The status 103 may be associated with the corresponding content by using the content ID. The status 103 may be associated with the corresponding content by using the address. A plurality contents may be associated with the status 103.

The information processing apparatus 4 is able to associate and manage the status and the content in association with each other, by organizing data as illustrated in FIG. 2. After the status determination section 45 changes the status 103 corresponding to the accessory ID, the output control section 43 and the match section 44 is capable of acquiring the changed content, content ID, address of content, for the accessory ID.

The data structure of FIG. 2 is described as a data structure about the data stored in the storage unit 41 of the information processing apparatus 4. However, the same data structure as in FIG. 2 may be used for data stored in the nonvolatile memory 32 of the wireless storage apparatus 3, data stored in the wireless communication memory 37 of the wireless storage apparatus 3, or data stored in the memory of the electronic apparatus 2.

Figure 3:
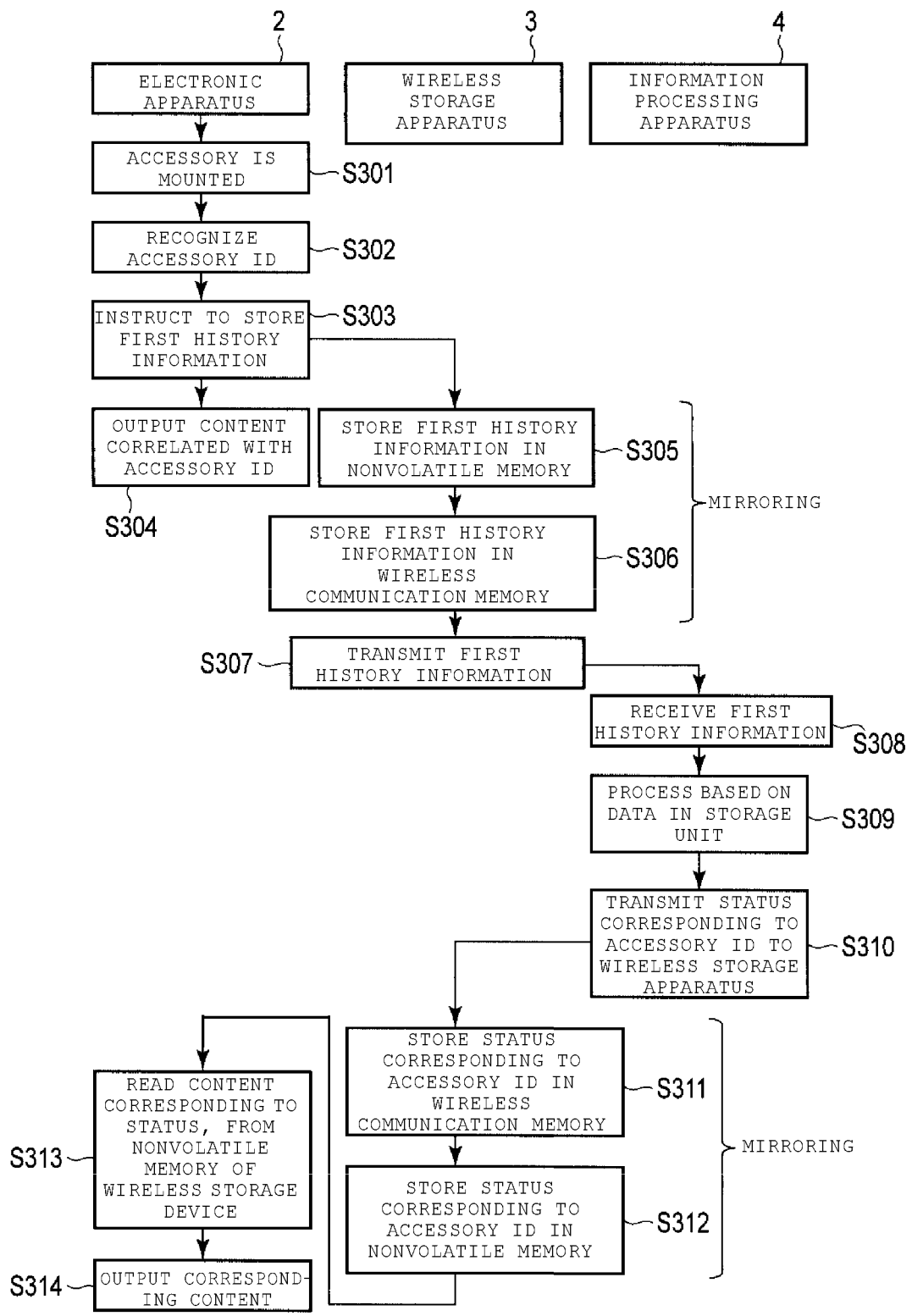
FIG. 3 is a flow chart illustrating a process carried out by the information processing system according to the first embodiment.

FIG. 3 is a flow chart illustrating a process carried out by tthe information processing system 1 according to the first embodiment.

In step S301, the accessory 5 is mounted on the electronic apparatus 2.

In step S302, the accessory control unit 21 of the electronic apparatus 2 reads the accessory ID of the accessory 5.

In step S303, the accessory control unit 21 instructs the wireless storage apparatus 3 to store the first history information 101, in other words, the accessory ID 102, and the use history 104 of the electronic apparatus 2. When the electronic apparatus 2 stores the status 103 in the nonvolatile memory 32, the accessory control unit 21 may give an instruction to store the status 103 associated with the accessory ID 102.

In step S304, the operation control unit 22 of the electronic apparatus 2 outputs the content corresponding to the accessory ID.

If the storing of the first history information 101 is instructed by the electronic apparatus 2 in step S303, the wireless storage apparatus 3 stores the first history information 101 in the nonvolatile memory 32, based on the instruction to store the first history information 101 from the electronic apparatus 2, in step S305.

In step S306, the wireless storage apparatus 3 stores the first history information 101 in the wireless communication memory 37 by performing mirroring between the nonvolatile memory 32 and wireless communication memory 37.

In step S307, the wireless storage apparatus 3 transmits the first history information 101 to the information processing apparatus 4, by performing wireless communication with the information processing apparatus 4.

In step S308, the receiving section 42 of the information processing apparatus 4 receives the first history information 101 from the wireless storage apparatus 3, and changes the second history information 201 by reflecting the content of the first history information 101 in the second history information 201 stored in the storage unit 41.

In step S309, the output control section 43 or the match section 44 of the information processing apparatus 4 performs various processes, based on the data stored in the storage unit 41. For example, the output control section 43 or the match section 44 performs output control of the content in various manners, or carry out a match between characters. The output control section 43 or the match section 44 adds the output history 206 or the match result to the second history information 201.

In step S310, the status determination section 45 of the information processing apparatus 4 determines status corresponding to the accessory ID 102, based on the data stored in the storage unit 41. In addition, after determining the status corresponding to the accessory ID 102, the output control section 43 may search for the content corresponding to the determined status from the storage unit 41, and output the searched content at the information processing apparatus 4. The status determination section 45 stores the determined status corresponding to the accessory ID 102 in the storage unit 41, so as to be included in the second history information 201. The status determination section 45 outputs the status 103 determined for the accessory ID 102 to the wireless storage apparatus 3, by performing wireless communication with the wireless storage apparatus 3. The status determination section 45 may transmit other data included in the second history information 201, together with the accessory ID 102 and the status 103, to the wireless storage apparatus 3, through wireless communication. In this case, in the following process, other data included in the second history information 201 is processed in the same way as the status 103.

In step S311, the wireless storage apparatus 3 receives the status 103 for the accessory ID 102, and stores the determined status corresponding to the accessory ID 102 in the wireless communication memory 37, so as to be included in the first history information 101 of the wireless communication memory 37.

In step S312, the wireless storage apparatus 3 stores the status 103 for the accessory ID 102 in the nonvolatile memory 32, by performing mirroring between the nonvolatile memory 32 and the wireless communication memory 37. For example, the wireless storage apparatus 3 stores the determined status corresponding to the accessory ID 102 in the nonvolatile memory 32, so as to be included in the first history information 101 of the nonvolatile memory 32.

In step S313, the operation control unit 22 of the electronic apparatus 2 recognizes the content corresponding to the determined status 103 corresponding to the accessory ID 102 stored in the nonvolatile memory 32 of the wireless storage apparatus 3, and reads the recognized content from the nonvolatile memory 32.

In step S314, the operation control unit 22 outputs the recognized content.

Figure 4:
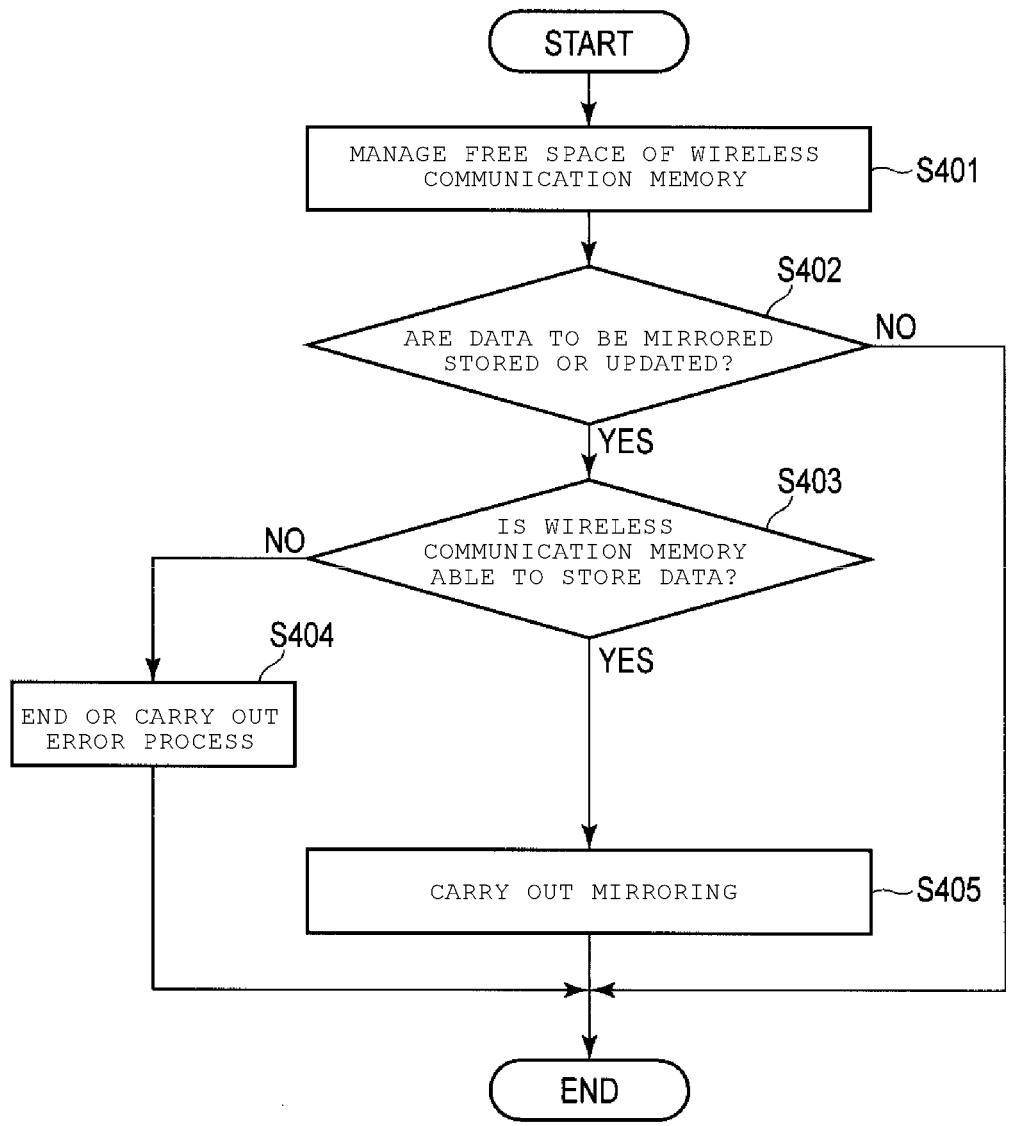
FIG. 4 is a flow chart illustrating mirroring carried out by a controller of a wireless storage device according to the first embodiment.

FIG. 4 is a flow chart illustrating mirroring executed by the controller 33 according to the present embodiment.

In step S401, the controller 33 manages the memory status indicating whether the wireless communication memory 37 is able to store data, based on the position of a free space and the data capacity of the free space of the wireless communication memory 37, and the number of accessory IDs stored in the wireless communication memory 37. For example, if the data capacity of the free space is equal to or greater than a first threshold, the controller 33 determines that the wireless communication memory 37 is in a memory status capable of storing data. For example, if the number of accessory IDs stored in the wireless communication memory 37 is equal or less than a second threshold, the controller 33 determines that the wireless communication memory 37 is in a memory status capable of storing data.

In step S402, the controller 33 determines whether or not data to be mirrored is stored or changed in at least one of the nonvolatile memory 32 and the wireless communication memory 37.

When the data to be mirrored is not stored or changed in at least one of the nonvolatile memory 32 and the wireless communication memory 37, the process is ended.

When the data to be mirrored is stored or changed in at least one of the nonvolatile memory 32 and the wireless communication memory 37, the controller 33 determines whether or not the wireless communication memory 37 is able to store data, based on the memory status, in step S403.

If the wireless communication memory 37 is determined to be not able to store data, the controller 33 ends the process or executes an error process in step S404. The error process may be, for example, a process of instructing the electronic apparatus 2 or the information processing apparatus 4 to output sound or display an image indicating that data are not successfully changed.

If the wireless communication memory 37 is able to store data, the controller 33 executes the mirroring in step S405.

Figure 5:
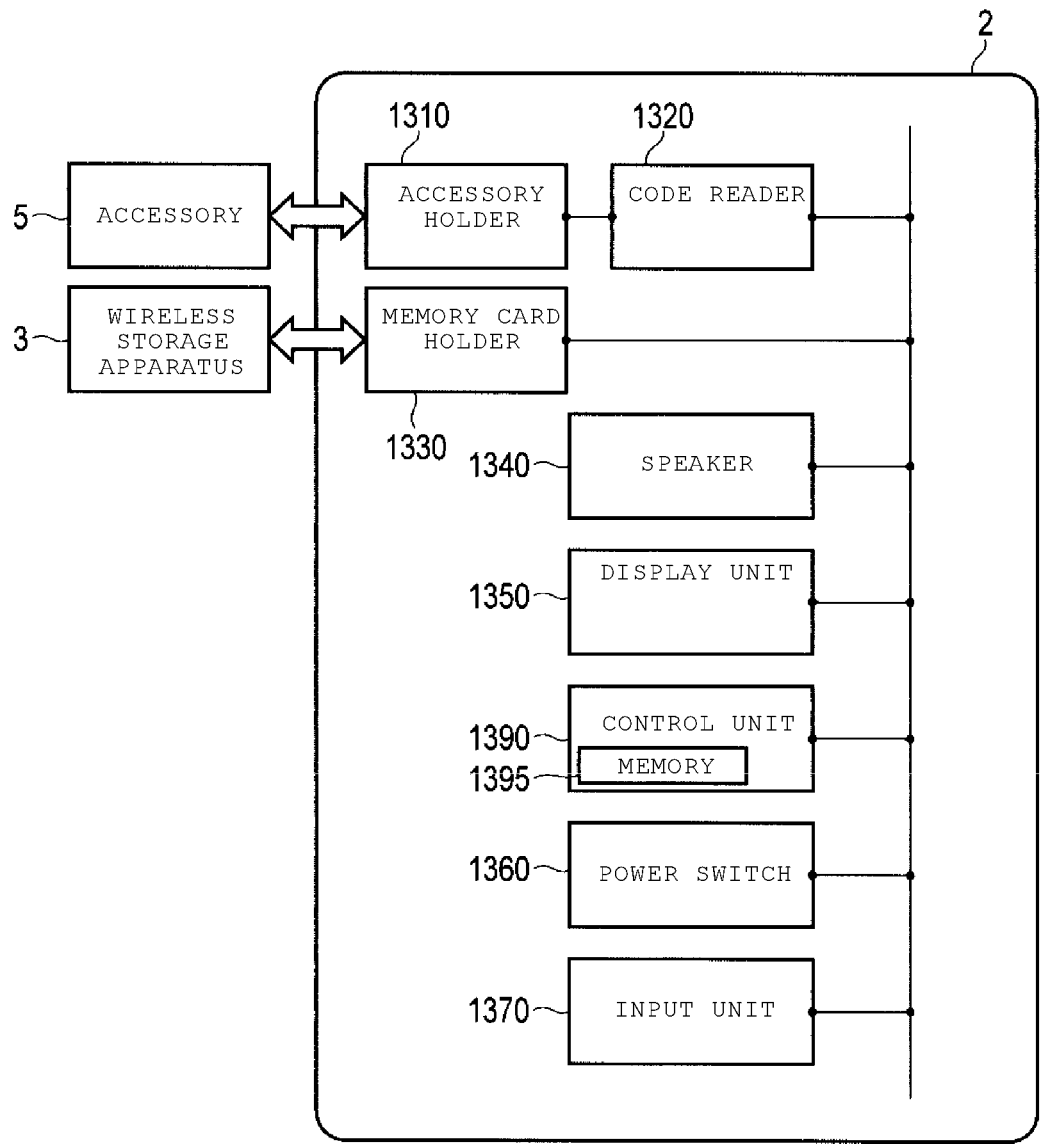
FIG. 5 is a block diagram of an electronic apparatus according to the first embodiment.

FIG. 5 is a block diagram of the electronic apparatus 2 according to the present embodiment.

The electronic apparatus 2 includes an accessory holder 1310, a code reader 1320, a memory card holder 1330, a speaker 1340, and a control unit 1390.

It is possible to insert a storage apparatus, for example, a memory card, to the memory card holder 1330 from the outside. In the present embodiment, the memory card holder 1330 can hold wireless storage apparatus 3, for example, a NFC chip-mounted memory card. The memory card holder 1330 corresponds to the mount unit 23 in FIG. 1.

The accessory holder 1310 holds, for example, the accessory 5 which is inserted from the outside. In addition, the accessory holder 1310 may hold the accessory 5, without being inserted from the outside. For example, the accessory holder 1310 may be a ring-shaped holder that holds the accessory 5 of a keychain type. The accessory holder 1310 corresponds to the mount unit 23b of FIG. 1.

The accessory 5 is, for example, is a card having a character depicted thereon. For example, one character is depicted on a single accessory 5. However, without being limited thereto, a plurality of characters may be depicted on a single accessory 5. Information about the depicted character is stored on the accessory 5. The accessory 5 has the information in the form of, for example, code. However, without being limited thereto, the accessory 5 may contain an NFC chip therein, and information about the character may be stored in the NFC chip. If the information about the character is stored in the NFC chip or an NFC tag, it is possible to rewrite the information, and for example, it is possible to easily upgrade of the character on the information processing system 1.

When the information about the depicted character is stored as a code, if the accessory 5 is held in the accessory holder 1310, the code of the accessory 5 faces the code reader 1320.

The code reader 1320 reads the information about the depicted character, from the code of the accessory 5, upon receipt of an instruction from the outside, and transmits the information about the character to the wireless storage apparatus 3. For example, the information about the character may include address information to be read from the nonvolatile memory 32 of the wireless storage apparatus 3.

The controller 33 of the wireless storage apparatus 3 receives the information about the character, and reads corresponding information. Specifically, the controller 33 transmits a read instruction to the memory controller 35, and outputs an address, and the memory controller 35 reads data from the memory of the address corresponding to the information about the character, and outputs the read data to the controller 33. The wireless storage apparatus 3 outputs the data to the speaker 1340.

The speaker 1340 converts the data into voice data through a DA converter (not illustrated), and generates sounds corresponding to the converted data. The user can listen to the sound corresponding to the accessory 5 mounted on the electronic apparatus 2.

In addition, the speaker 1340 may simply generate sound based on data directly read from the accessory 5.

The electronic apparatus 2 may include a display unit (display) 1350. If audio data and moving image data are included in the read data, the electronic apparatus 2 may output the audio data to the speaker 1340, and display a moving image corresponding to the moving image data on the display unit 1350. The electronic apparatus 2 may display the moving image on the display unit 1350 without generating sound based on the audio data.

The electronic apparatus 2 may include a power switch 1360 that is capable of turning on or off the electronic apparatus 2, and an input unit 1370. The input unit 1370 may include plurality of input means such as, for example, buttons and switches.

The control unit 1390 controls the code reader 1320, the speaker 1340, the display unit 1350, the power switch 1360, and the input unit 1370. The control unit 1390 communicates with the wireless storage apparatus 3.

In the present embodiment, the control unit 1390 may include the accessory control unit 21 and the operation control unit 22 of FIG. 1. The control unit 1390 may be implemented by hardware, or may be even implemented by a processor executing the software.

The control unit 1390 may include a memory 1395. Alternatively, the memory 1395 may be provided separately from the control unit 1390. The memory 1395 may be used as, for example, a cache memory that temporarily stores data. The memory 1395 may be, for example, a serial peripheral interface (SPI) flash memory.

Figure 6:
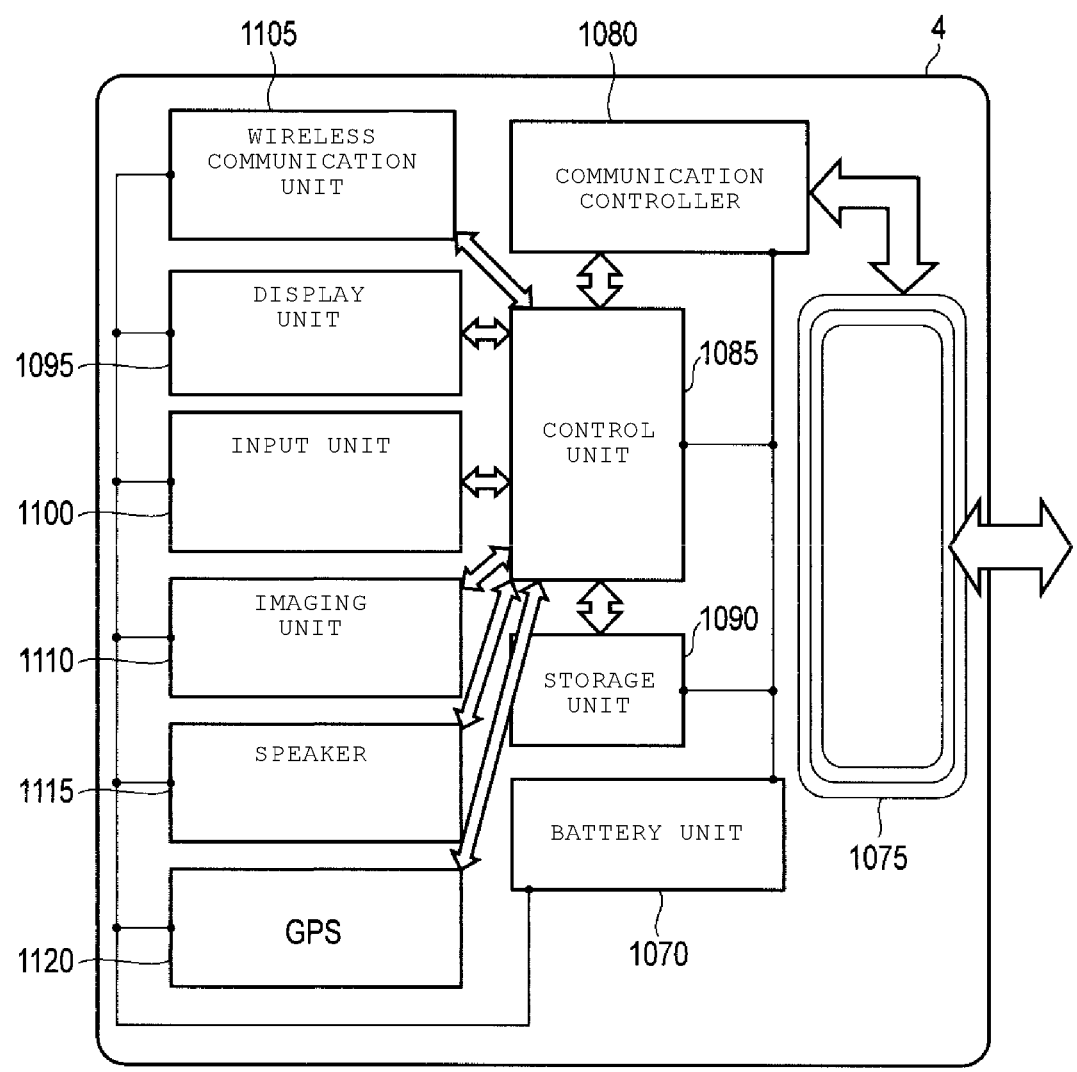
FIG. 6 is a block diagram illustrating a first configuration of the information processing apparatus according to the first embodiment.

FIG. 6 is a block diagram illustrating a first configuration of the information processing apparatus 4 according to the present embodiment. The information processing apparatus 4 is, for example, an apparatus having a wireless communication function, such as a smart phone, a personal digital assistant (PDA), a tablet, and a computer.

The information processing apparatus 4 includes a battery unit 1070, a wireless antenna 1075, a communication controller 1080, a control unit 1085, a storage unit 1090, a display unit 1095, an input unit 1100, a wireless communication unit 1105, an imaging unit 1110, a speaker 1115, and a GPS 1120. The communication controller 1080 and the control unit 1085 may be implemented as a single controller.

The information processing apparatus 4 is capable of performing an operation and communication, with power supplied from the battery unit 1070.

The information processing apparatus 4 is able to transmit and receive data, for example, according to an NFC interface. The information processing apparatus 4 may use another wireless communication interface.

The battery unit 1070 is a power source that supplies power to the information processing apparatus 4. The battery unit 1070 is, for example, a battery. The battery unit 1070 may be dry batteries, storage batteries, fuel cells, or the like. More specifically, a lithium ion battery may be used as the battery unit 1070. The battery unit 1070 may be disposed external to the information processing apparatus 4, and for example, may be an AC adapter connected to a commercial power supply, or the like.

The operable frequency band of the wireless antenna 1075 is set to a predetermined frequency band compatible with NFC.

The wireless antenna 1075 receives commands, addresses, data, information, instructions, signals, or the like, and outputs to the communication controller 1080, the received commands, addresses, data, information, instructions, signals, or the like. The wireless antenna 1075 outputs the commands, addresses, the data, the information, instructions, signals, or the like, which are received from the communication controller 1080. The wireless antenna 1075 is, for example, a PCB pattern antenna.

The communication controller 1080 controls the wireless antenna 1075. The communication controller 1080 is capable of outputting the commands, addresses, the data, the information, instructions, signals, or the like, which are received from the control unit 1085, through the wireless antenna 1075. The communication controller 1080 is capable of outputting the data that is received by the wireless antenna 1075, to the control unit 1085.

The control unit 1085 controls various operation carried out by each unit of information processing apparatus 4, for example, based on input from the input unit 1100, the wireless communication unit 1105, the imaging unit 1110, and the wireless storage apparatus 3. The control unit 1085 controls each unit of information processing apparatus 4, based on the input data or the calculation result of the data, and outputs the commands or the like to each unit as necessary.

The control unit 1085 is, for example, a semiconductor chip, a circuit formed on a substrate, or one or more combinations thereof. The control unit 1085 may include at least one of a cache memory and a register that store data temporarily.

The control unit 1085 is capable of outputting the commands, the addresses, the data, the information, the instructions, the signals, or the like to the wireless antenna 1075 through the communication controller 1080. The control unit 1085 receives the commands, the addresses, the data, the information, the instructions, the signals, or the like which are received by the wireless antenna 1075, and the commands, the addresses, the data, the information, the instructions, the signals, or the like which are read from the wireless storage apparatus 3, through the communication controller 1080.

When writing data into the wireless storage apparatus 3, the control unit 1085 outputs data input from each unit or the calculation result of these data, a write command, and an address, to the communication controller 1080.

The control unit 1085 is electrically connected to each unit of information processing apparatus 4, and electrically communicates with each unit. In other words, the control unit 1085 is able to receive the data from each unit, and output the data or the calculation result of the data. For example, the control unit 1085 calculates (generates) synthetic image data by highlighting the captured data that is captured by the imaging unit 1110, and outputs the synthetic image data to the display unit 1095. For example, the control unit 1085 calculates (generates) synthetic image data, based on the image data read from the storage unit 1090, and is able to output the synthetic image data to the display unit 1095. These are merely examples, and the control unit 1085 receives data from the respective units, and is able to output a calculation result of the data.

In the present embodiment, the control unit 1085 may include the receiving section 42, the output control section 43, the match section 44, and the status determination section 45 of FIG. 1. The control unit 1085 may be implemented by hardware, or may be even implemented by the processor executing the software.

The storage unit 1090 outputs the stored data to the control unit 1085, based on communication with the control unit 1085. The storage unit 1090 stores data received from the control unit 1085, based on communication with the control unit 1085. The storage unit 1090 is, for example, a memory controller and a nonvolatile memory. Similar to the nonvolatile memory 32, various memories are used as the nonvolatile memory. The memory controller controls the nonvolatile memory. The storage unit 1090 may be, for example, a hard disk drive (HDD), a solid state disk (SSD), or the like. In the present embodiment, the storage unit 1090 may include the storage unit 41 of FIG. 1.

The display unit 1095 outputs data received from the control unit 1085 in a form that a user can recognize. The display unit 1095 is, for example, a display. The user is able to visually recognize the data displayed on the display. Specifically, various types of displays such as a liquid crystal display, a plasma display, an organic EL display, and a three-dimensional display may be used for the display unit 1095. The display unit 1095 displays an image corresponding to the data received from the control unit 1085, on the display. The display unit 1095 is able to display, for example, an image or a moving image which is concurrently captured by the imaging unit 1110.

The input unit 1100 outputs the input of the user as input data, to the control unit 1085. The input unit 1100 is, for example, a touch panel provided on the display. If the user touches the touch panel on the display, the input unit 1100 detects the pressed position on the touch panel, and outputs position information as input data to the control unit 1085. Specifically, switches arranged in a matrix, or various touch panels of a resistive type, a surface acoustic wave type, an infrared type, an electromagnetic induction type, and an electrostatic capacitance type may be used for the input unit 1100.

The input unit 1100 may be, for example, a microphone. If the user utters a voice, the input unit 1100 may detect the voice, extract input data by voice conversion, and output the extracted input data to the control unit 1085.

The wireless communication unit 1105 includes a wireless antenna and a wireless controller. The wireless communication unit 1105 transmits and receives data, through wireless communication. The wireless communication unit 1105 outputs the data received from the outside, to the control unit 1085. The wireless communication unit 1105 transmits data received from the control unit 1085, to the outside.

The imaging unit 1110 is able to capture one or both of a still image and a moving image. The imaging unit 1110 outputs the captured data (image data), in other words, still image data or moving image data to the control unit 1085. The imaging unit 1110 may be configured to capture a code on the surface of the wireless storage apparatus 3. The imaging unit 1110 is, for example, a camera. More specifically, the imaging unit 1110 is, a solid photographing device, for example, a camera using a charge coupled device (CCD) sensor, and a complementary metal oxide semiconductor (CMOS) sensor.

The speaker 1115 outputs sound corresponding to the audio data received from the control unit 1085.

The GPS 1120 acquires position information of the information processing apparatus 4, and outputs the position information to the control unit 1085.

Figure 7:
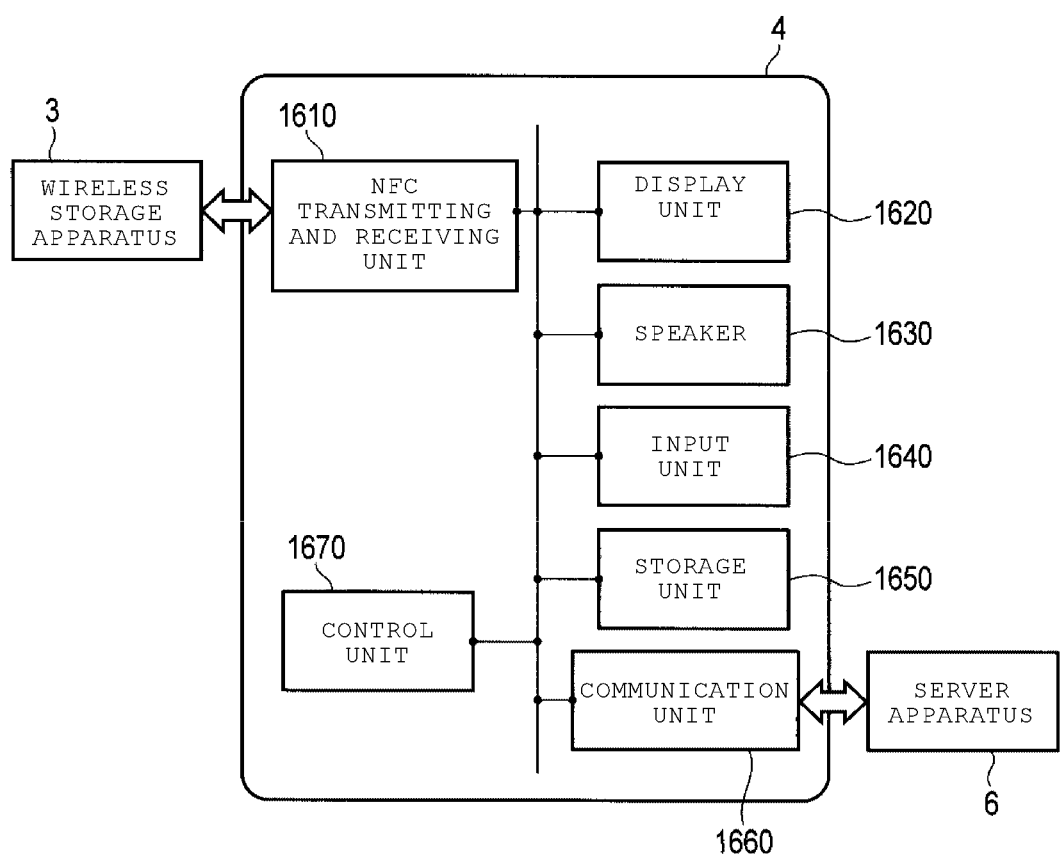
FIG. 7 is a block diagram illustrating a second configuration of the information processing apparatus according to the first embodiment.

FIG. 7 is a block diagram illustrating a second configuration of the information processing apparatus 4 according to the present embodiment. The information processing apparatus 4 illustrated in FIG. 7 is a station apparatus (kiosk).

The information processing apparatus 4 includes a NFC transmitting and receiving unit 1610, a display unit (display) 1620, a speaker 1630, an input unit 1640, a storage unit 1650, a communication unit 1660, and a control unit 1670.

The NFC transmitting and receiving unit 1610 performs NFC communication with apparatuses external of the information processing apparatus 4, in response to the instruction of the control unit 1670. For example, the NFC transmitting and receiving unit 1610 performs NFC communication with the wireless storage apparatus 3.

The display unit 1620 is, for example, any display such as a liquid crystal display and an organic EL display. The display unit 1620 displays, for example, information that the information processing apparatus 4 is in NFC communication, and that the communication has been completed.

The speaker 1630 generates sound in response to the instruction of the control unit 1670.

The input unit 1640 is, for example, a keyboard or a button. Alternatively, the display unit 1620 is a display, and a touch panel may be used as the input unit 1640.

The storage unit 1650 is, for example, any storage element such as a HDD, an SSD, and a flash memory. The storage unit 1650 stores, for example, data to be transmitted to the outside. The data include voice data of the character, moving image data, or the like. In the present embodiment, the storage unit 1650 may include the storage unit 41 of FIG. 1.

The communication unit 1660 communicates with for example, the server apparatus 6, which is external of the information processing apparatus 4, through wired or wireless communication, in response to the instruction of the control unit 1670. The communication unit 1660 acquires data stored to the storage unit 1650 from the external server apparatus 6.

The control unit 1670 controls the NFC transmitting and receiving unit 1610, the display unit 1620, the speaker 1630, the input unit 1640, the storage unit 1650, and the communication unit 1660.

In the present embodiment, the control unit 1670 may include the receiving section 42, the operation determination section 43, and the content generation section 44 of FIG. 1. The control unit 1085 may be implemented by hardware, or may be even implemented by the processor executing the software.

Figure 8A:
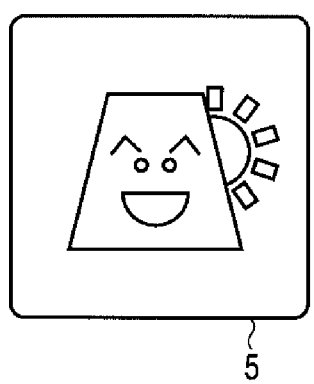
FIGS. 8A and 8B are plan views of an accessory according to the first embodiment.
Figure 8B:
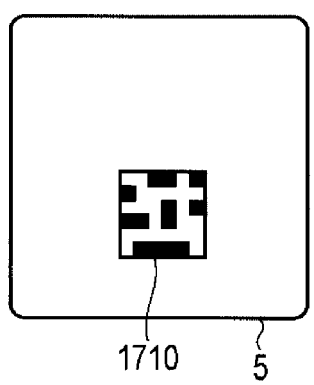

FIGS. 8A and 8B are a schematic plan view of the accessory 5 according to the present embodiment. FIG. 8A is a plan view of one surface (front surface) of the accessory 5. FIG. 8B is a plan view of the other surface (back surface) of the accessory 5.

The accessory 5 includes, for example, a character and a code 1710. The code 1710 can be read by the code reader 1320 of the electronic apparatus 2.

According to the present embodiment described above, the information processing apparatus 4 is able to acquire the first history information 101 including the status 103 and the use history 104 of the accessory 5, through the wireless storage apparatus 3. As a result, the information processing apparatus 4 is able to perform various processes, based on the status 103 and the use history 104 of the accessory 5, and output the content based on the processing result.

Further, the information processing apparatus 4 is able to change the content to be output from the electronic apparatus 2, by changing the status 103 of the accessory 5, based on the use history 104, the personal information 202, the position information 203, the calendar information 204, the time information, and the weather information, which are stored in the information processing apparatus 4, and outputting the status 103 to the wireless storage apparatus 3.

According to the present embodiment, even if the electronic apparatus 2 is, for example, a stand-alone device that does not have a communication function, the electronic apparatus 2 can change the information to be displayed on the information processing apparatus 4, depending on the use state of the electronic apparatus 2. In addition, the information processing apparatus 4 can change the first history information 101 which is used in the electronic apparatus 2 when the wireless storage apparatus 3 is mounted on the electronic apparatus 2. In this manner, it is possible to provide attractive services to the user, by enabling communication between the electronic apparatus 2 and the information processing apparatus 4.

For example, there is a toy system in which a character doll stores the character ID and status of a corresponding character in a memory of the doll, a game machine reads the character ID and the status from the memory of the doll, uses the character ID and the status in a game, and then stores the status that is changed in the game in the memory of the doll. In this toy system, the doll and the game machine operate in a one-to-one relationship. If the number of characters is increased, the number of dolls is also increased. If the user wants to change the status of each of a large number of dolls, it is required to set dolls in the game machine as much as the number of dolls. In contrast, in the present embodiment, the electronic apparatus 2 can store the status 103 and the use history 104 of each of a plurality of accessories 5 in the wireless storage apparatus 3. For that reason, the wireless storage apparatus 3 can collectively manage the status 103 and the use history 104 of the plurality of accessories 5, and collectively transmit the status 103 and the use history 104 of the plurality of accessories 105 to the information processing apparatus 4. Further, the information processing apparatus 4 can collectively transmit the status 103 and the use history 104 of the plurality of accessories 5 to the wireless storage apparatus 3, and the wireless storage apparatus 3 is able to perform management by collectively changing the status 103 and the use history 104 of the plurality of accessories 5. Therefore, even if the number of accessories 5 is increased, it is possible to easily change and manage the status 103 and the use history 104 of each accessory 5.

Second Embodiment

In a second embodiment, specific use examples of the information processing system 1 according to the first embodiment will be described.

In the following first to fourth use examples, the electronic apparatus 2 is a toy, and the information processing apparatus 4 is a smartphone or a game apparatus.

In the following first to fourth use examples, in order to simplify the description, when there is no explanation in particular, it is assumed that a single user ID is transmitted in the transmission of user IDs, and a single accessory ID is transmitted in the transmission of accessory IDs between the wireless storage apparatus 3 and the information processing apparatus 4. However, a plurality of user IDs may be transmitted and a plurality of accessory IDs may be transmitted between the wireless storage apparatus 3 and the information processing apparatus 4. The same is applied to data other than the user ID and the accessory ID.

First Use Example

Figure 9:
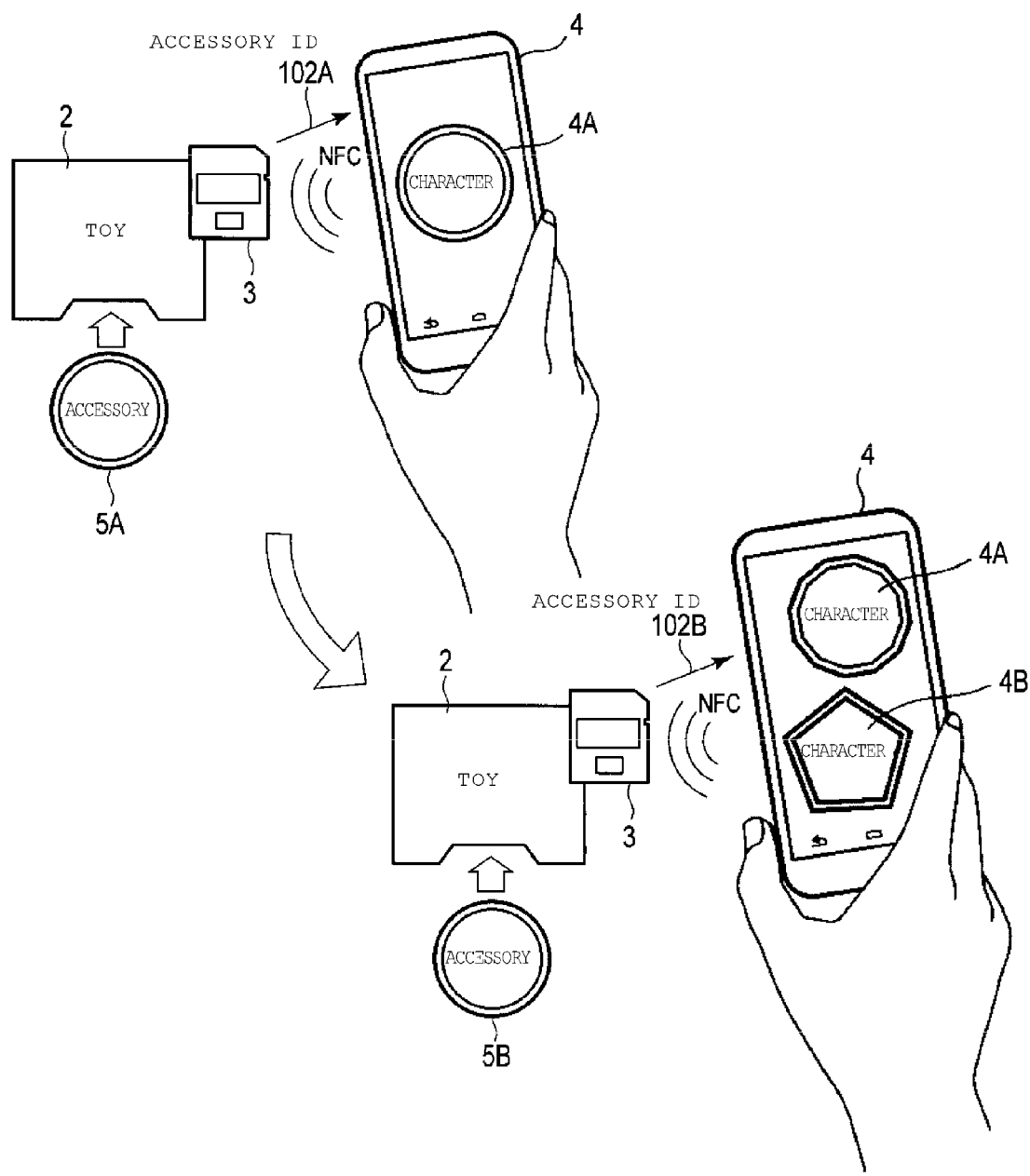
FIG. 9 is a conceptual diagram illustrating a first use example of an information processing system according to a second embodiment.

FIG. 9 is a conceptual diagram illustrating a first use example of the information processing system 1 according to the present embodiment.

The same is applied to the following second to fourth use examples.

The user first mounts the accessory 5A on the electronic apparatus 2. Then, the electronic apparatus 2 acquires the accessory ID 102A of the accessory 5A, and stores the accessory ID 102A in the wireless storage apparatus 3.

If user moves the information processing apparatus 4 close to, or brings it into contact with the wireless storage apparatus 3, the information processing apparatus 4 receives the accessory ID 102A from the wireless storage apparatus 3 through wireless communication, and stores the received accessory ID 102A in the storage unit 41 of the information processing apparatus 4. Then, the information processing apparatus 4 displays a character 4A corresponding to the accessory 5A mounted on the electronic apparatus 2, based on the accessory ID 102A.

Next, the user mounts the accessory 5B on the electronic apparatus 2, instead of the accessory 5A. Then, the electronic apparatus 2 acquires the accessory ID 102B of the accessory 5B, and stores the accessory ID 102B in the wireless storage apparatus 3.

If user moves the information processing apparatus 4 close to, or brings it into contact with the wireless storage apparatus 3, the information processing apparatus 4 receives the accessory ID 102B from the wireless storage apparatus 3 through wireless communication, and stores the received accessory ID 102B in the storage unit 41 of the information processing apparatus 4. Then, the information processing apparatus 4 displays the character 4A corresponding to the accessory ID 102A stored in the storage unit 41, and thereafter displays a character 4B corresponding to the accessory ID 102B stored in the storage unit 41.

For example, the history information including the accessory ID 102A and the accessory ID 102B may be stored in the wireless storage apparatus 3, may be stored in the information processing apparatus 4, or may be stored in both the wireless storage apparatus 3 and the information processing apparatus 4. The same is applied to the following second to fourth use examples.

In the first use example, the character 4A talks to the user "Did you call me?" If the accessory 5A is replaced with the accessory 5B, the character 4B talks to the user "Did you call me?" Also, the information processing apparatus 4 displays the characters 4A and 4B.

Second Use Example

Figure 10:
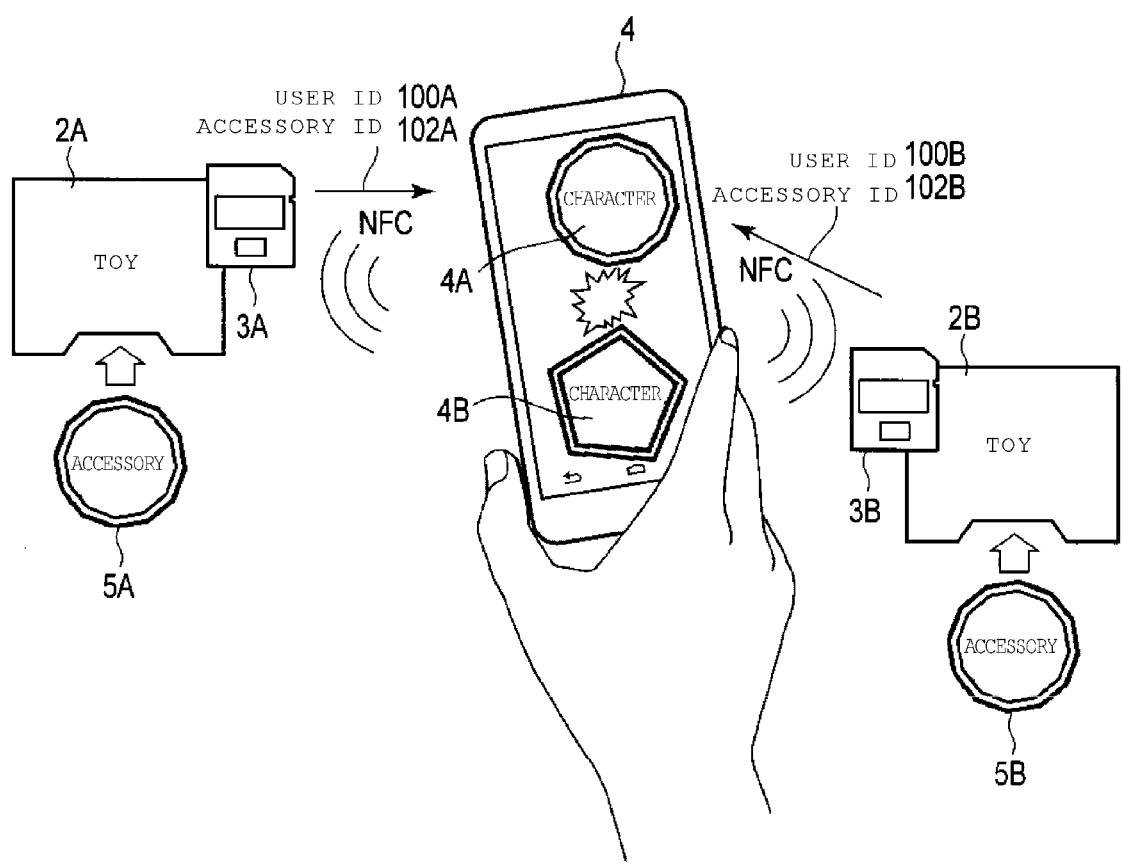
FIG. 10 is a conceptual diagram illustrating a second use example of the information processing system according to the second embodiment.

FIG. 10 is a conceptual diagram illustrating a second use example of the information processing system 1 according to the present embodiment.

First, a first user mounts the accessory 5A on the electronic apparatus 2A. Then, the electronic apparatus 2A acquires the accessory ID 102A of the accessory 5A, and stores a user ID 100A of the first user and the accessory ID 102A in the wireless storage apparatus 3A in association with each other.

A second user mounts the accessory 5B on the electronic apparatus 2B. Then, the electronic apparatus 2B acquires the accessory ID 102B of the accessory 5B, and stores a user ID 100B of the second user and the accessory ID 102B in the wireless storage apparatus 3B in association with each other.

If the first user or the second user moves the information processing apparatus 4 close to, or brings it into contact with the wireless storage apparatus 3A, the information processing apparatus 4 receives the user ID 100A and the accessory ID 102A from the wireless storage apparatus 3A through wireless communication, and stores the user ID 100A and the received accessory ID 102A in the storage unit 41 of the information processing apparatus 4.

If the first user or the second user moves the information processing apparatus 4 close to, or brings it into contact with the wireless storage apparatus 3B, the information processing apparatus 4 receives the user ID 100B and the accessory ID 102B from the wireless storage apparatus 3B through wireless communication, and stores the user ID 100B and the received accessory ID 102B in the storage unit 41 of the information processing apparatus 4.

The information processing apparatus 4 performs various services based on the various types of data stored in the storage unit 41.

For example, the information processing apparatus 4 provides a game that a character 4A corresponding to the accessory ID 102A and a character 4B corresponding to the accessory ID 102B play a match against each other. The information processing apparatus 4 manages a match result 205 for respective user IDs 100A and 100B, and respective accessory IDs 102A and 102B. The information processing apparatus 4 may switch sounds of the characters 4A and 4B in response to the match result 205. The status such as the strength or growth information of characters 4A and 4B may be changed, based on the match result 205, the use history 104 (for example, the number of accessories that are held) of the first user and the second user, or the like.

The information processing apparatus 4 transmits the match result 205 of each user to the server apparatus 6, and the server apparatus 6 may provide the user awards (for example, unusual content) depending on the match result 205.

Third Use Example

Figure 11:
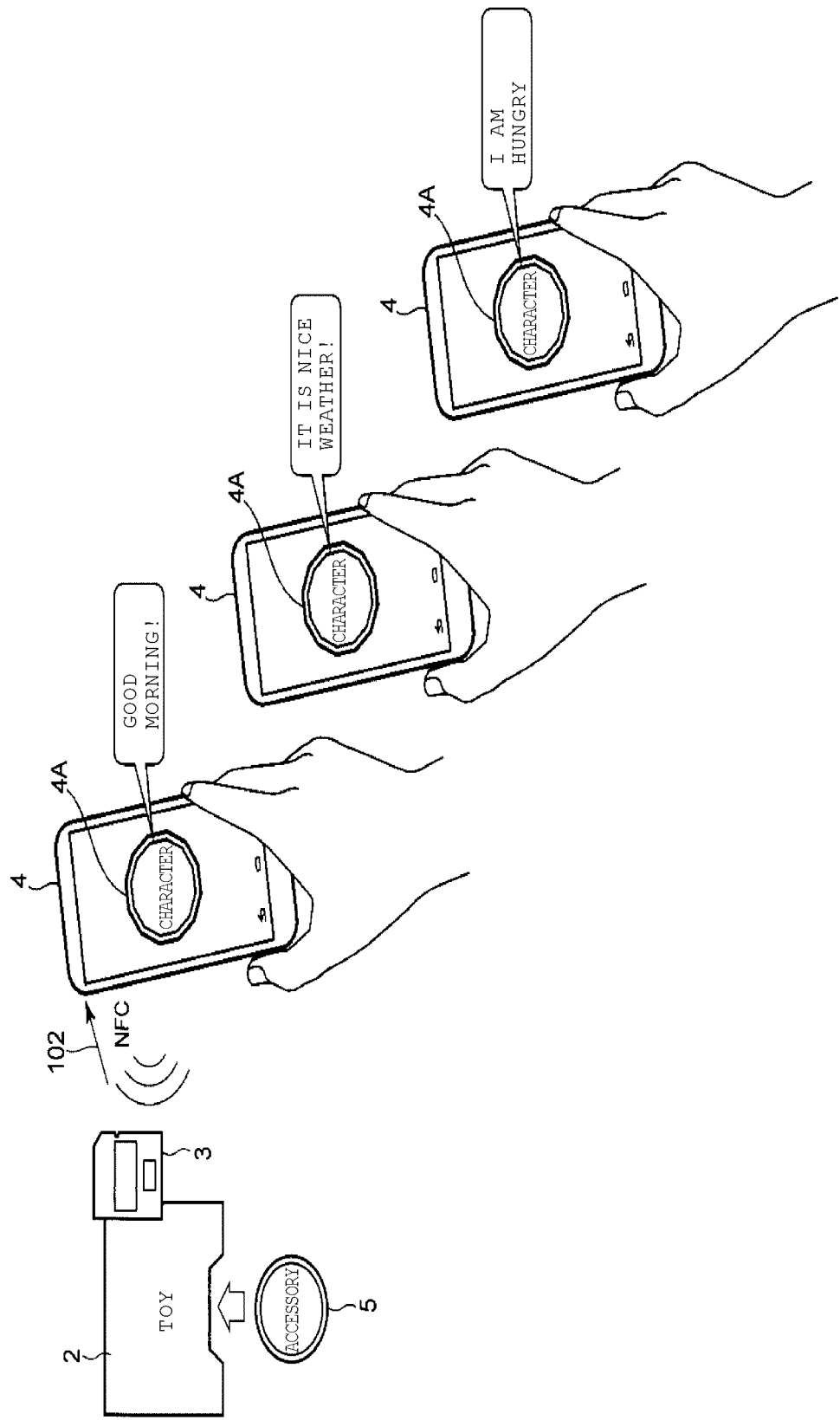
FIG. 11 is a conceptual diagram illustrating a third use example of the information processing system according to the second embodiment.

FIG. 11 is a conceptual diagram illustrating a third use example of the information processing system 1 according to the present embodiment.

First, a user mounts the accessory 5 on the electronic apparatus 2. Then, the electronic apparatus 2 acquires the accessory ID 102 of the accessory 5, and stores the accessory ID 102 in the wireless storage apparatus 3.

If the user moves the information processing apparatus 4 close to, or brings it into contact with the wireless storage apparatus 3, the information processing apparatus 4 receives the accessory ID 102 from the wireless storage apparatus 3 through wireless communication, and stores the received accessory ID 102 in the storage unit 41 of the information processing apparatus 4. Then, the information processing apparatus 4 displays a character 4A corresponding to the accessory 5 mounted on the electronic apparatus 2, based on the accessory ID 102 and an output history 206 that is stored in the storage unit 41 and corresponds to the accessory ID 102.

Each time the user moves the information processing apparatus 4 close to, or brings it into contact with the wireless storage apparatus 3, the output history 206 of the storage unit 41 is updated.

Therefore, the information processing apparatus 4 can change the display contents of the character 4A and the contents that the character 4A speaks, each time the information processing apparatus 4 and the wireless storage apparatus 3 perform wireless communication. Further, the information processing apparatus 4 can change the display contents of the character 4A and the contents that the character 4A speaks, based on the personal information 202, the position information 203, the calendar information 204, the time information, and the weather information, which are stored in the information processing apparatus 4.

For example, each time the user moves the information processing apparatus 4 close to the wireless storage apparatus 3, the information processing apparatus 4 can change the appearance, sound, music, and voice of the character 4.

The information, which is used by the information processing apparatus 4 in order to change the content to be output, may be stored in the wireless storage apparatus 3, in the information processing apparatus 4, or in both the wireless storage apparatus 3 and the information processing apparatus 4.

Fourth Use Example

Figure 12:
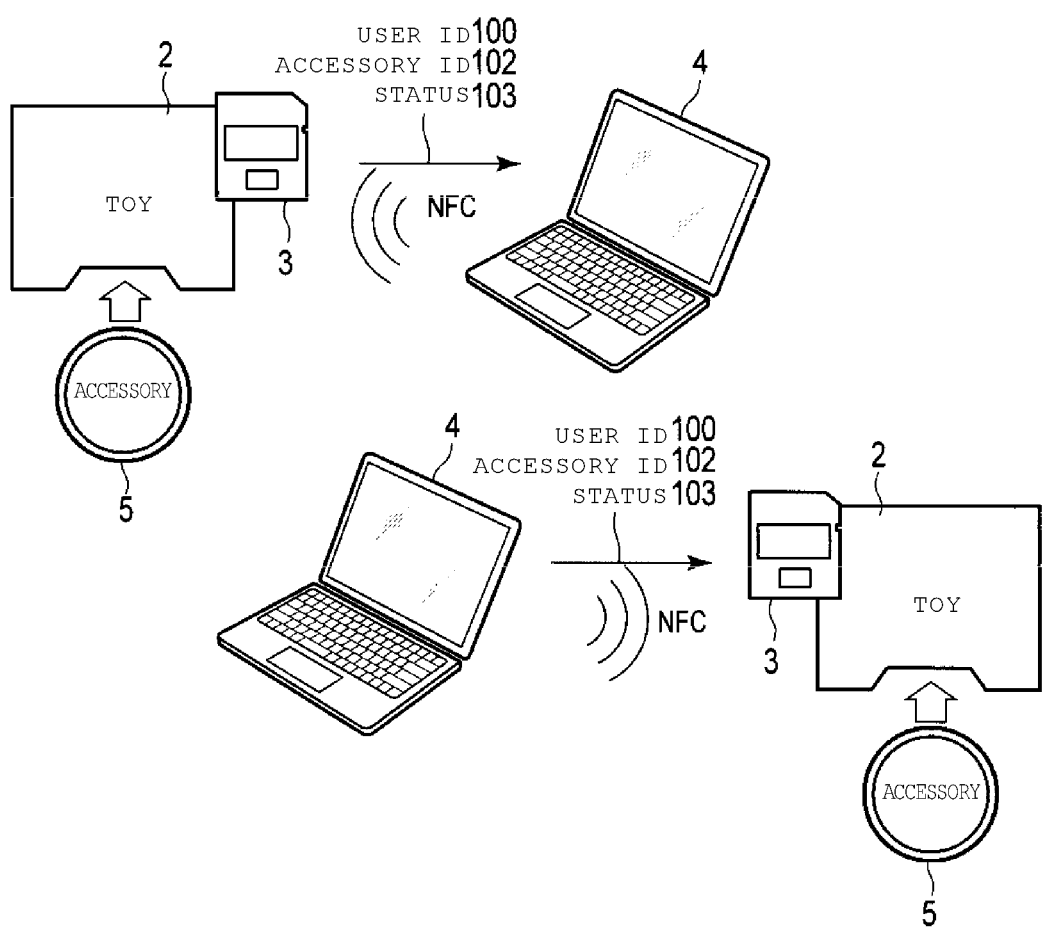
FIG. 12 is a conceptual diagram illustrating a fourth use example of the information processing system according to the second embodiment.

FIG. 12 is a conceptual diagram illustrating a fourth use example of the information processing system 1 according to the present embodiment.

First, a user mounts the accessory 5 on the electronic apparatus 2. Then, the electronic apparatus 2 acquires the accessory ID 102 of the accessory 5, and stores a user ID 100 of the user, the accessory ID 102, and the status 103 of the character corresponding to the accessory ID 102 in the wireless storage apparatus 3 in association with each other. If the user switches the accessory 5 with a new accessory, the electronic apparatus 2 further stores the user ID 100, the accessory ID of the new accessory, and the status of the character corresponding to the accessory ID, in the wireless storage apparatus 3. For example, the electronic apparatus 2 stores the status 103 of the character and the use history 104 of the electronic apparatus 2 which are updated in accordance with use of the electronic apparatus 2, in the wireless storage apparatus 3. For example, the status may be determined according to the number of accessories mounted on the electronic apparatus 2.

If user moves the information processing apparatus 4 close to, or brings it into contact with the wireless storage apparatus 3, the information processing apparatus 4 receives the user ID 100, the accessory ID 102, and the status 103, from the wireless storage apparatus 3, through wireless communication, and stores the received data in the storage unit 41 of the information processing apparatus 4.

The information processing apparatus 4 can cause the character corresponding to the accessory ID 102 to appear in the game, in the growth state indicated by the status 103. The information processing apparatus 4 can change the image and sound of the character in accordance with the status 103 and can display the status 103. Thus, the user can check the status 103 of each character, by moving the wireless storage apparatus 3 close to the information processing apparatus 4.

To the contrary, if user moves the information processing apparatus 4 close to, or brings it into contact with the wireless storage apparatus 3, the information processing apparatus 4 transmits the user ID 100, the accessory ID 102, and the status 103 that is changed based on the game result, to the wireless storage apparatus 3, through wireless communication.

The wireless storage apparatus 3 stores the user ID 100, the accessory ID 102, and the changed status 103, which are received from the information processing apparatus 4, through wireless communication.

The electronic apparatus 2 is able to display a grown character or output a sound corresponding to the grown character, depending on the status 103 which is changed in a game in the information processing apparatus 4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method carried out by an information processing apparatus, comprising:
   receiving, from a storage apparatus that has a wireless communication function and is within a wireless communication range of the information processing apparatus, an accessory ID of an accessory and status information of the accessory ID that were stored in the storage apparatus, as a result of: (i) the accessory and the storage apparatus being physically coupled with a host device, and (ii) the accessory ID being read from a surface of the accessory and then stored in the storage apparatus in association with the status information by the host device;
   executing, on the information processing apparatus, a user-interactive application in association with the received accessory ID and the status information thereof, the status information of the accessory ID being updated during execution of the user-interactive application; and
   transmitting wirelessly, from the information processing apparatus to the storage apparatus, the accessory ID and the updated status information, wherein
   a first visual or audio output corresponding to the accessory ID and the updated status information is generated by the host device when the storage apparatus is physically coupled with the host device, the first visual or audio output being different from a visual or audio output generated by the host device when the storage apparatus was physically coupled with the host device prior to the update.

2. The method according to claim 1, wherein
   a second accessory ID of a second accessory and second status information of the second accessory ID are received from the storage apparatus along with the accessory ID and the status information, wherein
   the second accessory ID and the second status information were stored in the storage apparatus, as a result of: (i) the second accessory and the storage apparatus being physically coupled with the host device, and (ii) the second accessory ID being read from a surface of the second accessory and then stored in the storage apparatus in association with the second status information by the host device.

3. The method according to claim 2, further comprising:
   executing, on the information processing apparatus, the user-interactive application in association with the received second accessory ID and the second status information, the second status information of the second accessory ID being updated during execution of the user-interactive application, wherein
   the second accessory ID and the updated second status information are transmitted to the storage apparatus along with the accessory ID and the updated status information.

4. The method according to claim 1, further comprising:
   receiving, from a second storage apparatus that has a wireless communication function and is within the wireless communication range of the information processing apparatus, a second accessory ID of a second accessory and second status information of the second accessory ID that were stored in the second storage apparatus, as a result of: (i) the second accessory and the second storage apparatus being physically coupled with a second host device, and (ii) the second accessory ID being read from a surface of the second accessory and then stored in the second storage apparatus in association with the second status information by the second host device.

5. The method according to claim 4, wherein
   during execution of the user-interactive application, a sub application based on the accessory ID, the status information thereof, the second accessory ID, and the second status information thereof is executed, and the status information of the accessory ID is updated as a result of the execution of the sub application.

6. The method according to claim 1, further comprising:
   generating, with the information processing apparatus, a unique visual or audio output corresponding to the accessory ID and the updated status information.

7. The method according to claim 1, wherein
   the status information of the accessory ID is updated based on at least one of user information, position information of the information processing apparatus, and date information that are stored in the information processing apparatus.

8. The method according to claim 1, wherein
   the accessory ID corresponds to a game character, and the status information of the accessory ID corresponds to a status of the game character.

9. The method according to claim 1, wherein
   data of the unique visual or audio output corresponding to the accessory ID and the updated status information are stored in a data storage unit of the information processing apparatus, and the data are transmitted to the storage apparatus along with the accessory ID and the updated status information.

10. The method according to claim 1, wherein
    the wireless communication conforms to a near field communication (NFC) standard.

11. An information processing apparatus, comprising:
    a wireless communication unit that causes an induction current for wireless communication with a storage apparatus that has a wireless communication function using power generated in the storage apparatus by the induction current; and
    a processor that
    executes a user-interactive application in association with an accessory ID of an accessory and status information thereof, when the accessory ID and the status information are received from the storage apparatus that is within a wireless communication range, the status information of the accessory ID being updated during execution of the user-interactive application, and
    transmits wirelessly, to the storage apparatus, the accessory ID and the updated status information, such that a first visual or audio output corresponding to the accessory ID and the updated status information is generated by a host device when the host device is physically coupled with the storage apparatus, the first visual or audio output being different from a visual or audio output generated by the host device when the storage apparatus was physically coupled with the host device prior to the update.

12. The information processing apparatus according to claim 11, wherein
    a second accessory ID of a second accessory and second status information of the second accessory ID are received from the storage apparatus along with the accessory ID and the status information.

13. The information processing apparatus according to claim 12, wherein
the processor also executes the user-interactive application in association with the received second accessory ID and the second status information, the second status information of the second accessory ID being updated during processing of the user-interactive application, and transmits wirelessly the second accessory ID and the updated second status information to the storage apparatus along with the accessory ID and the updated status information.

14. The information processing apparatus according to claim 11, wherein
the user-interactive application is executed after a second accessory ID of a second accessory and second status information of the second accessory ID are received from a second storage apparatus that has a wireless communication function and is within the wireless communication range of the wireless communication unit.

15. The information processing apparatus according to claim 14, wherein
during the user-interactive application, a sub application based on the accessory ID, the status information thereof, the second accessory ID, and the second status information thereof is carried out, and the status information of the accessory ID is updated as a result of the sub application.

16. The information processing apparatus according to claim 11, further comprising:
a display, wherein
the processor is configured to control the display to generate a unique visual output corresponding to the accessory ID and the updated status information.

17. The information processing apparatus according to claim 11, further comprising:
a speaker, wherein
the processor is configured to control the speaker to generate a unique audio output corresponding to the accessory ID and the updated status information.

18. The information processing apparatus according to claim 11, further comprising:
a data storage unit, wherein
the status information of the accessory ID is updated based on at least one of user information, position information of the wireless communication device, and date information that are stored in the data storage unit.

19. The information processing apparatus according to claim 11, further comprising:
a data storage unit, wherein
data of the unique visual or audio output corresponding to the accessory ID and the updated status information are stored in the data storage unit, and the data are transmitted to the storage apparatus along with the accessory ID and the updated status information.

20. The information processing apparatus according to claim 11, wherein
the wireless communication conforms to a near field communication (NFC) standard.

* * * * *